United States Patent
Cai et al.

(10) Patent No.: US 11,396,004 B2
(45) Date of Patent: Jul. 26, 2022

(54) NANO-ENABLED ACTIVATED CARBON BLOCKS TO ENABLE REMOVAL OF OXYANIONS FROM WATER

(71) Applicants: ACCESS BUSINESS GROUP INTERNATIONAL LLC, Ada, MI (US); ARIZONA BOARD OF REGENTS ON BEHALF OF ARIZONA STATE UNIVERSITY, Scottsdale, AZ (US)

(72) Inventors: Zhenxiao Cai, Kenmore, WA (US); Scott A. Mollema, Rockford, MI (US); Ariel J. Atkinson, Scottsdale, AZ (US); Kiril D. Hristovski, Gilbert, AZ (US); Jasmina S. Markovski, Mesa, AZ (US); Paul K. Westerhoff, Scottsdale, AZ (US)

(73) Assignees: Access Business Group International LLC, Ada, MI (US); Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 16/355,016

(22) Filed: Mar. 15, 2019

(65) Prior Publication Data

US 2020/0290014 A1 Sep. 17, 2020

(51) Int. Cl.
| | | |
|---|---|---|
| *B01J 20/20* | (2006.01) | |
| *B01J 20/30* | (2006.01) | |
| *B01J 20/28* | (2006.01) | |
| *B01J 20/32* | (2006.01) | |
| *C02F 1/28* | (2006.01) | |
| *C02F 101/10* | (2006.01) | |
| *C02F 101/20* | (2006.01) | |

(52) U.S. Cl.
CPC ........... *B01J 20/20* (2013.01); *B01J 20/2803* (2013.01); *B01J 20/28004* (2013.01); *B01J 20/28016* (2013.01); *B01J 20/3035* (2013.01); *B01J 20/3042* (2013.01); *B01J 20/3071* (2013.01); *B01J 20/3078* (2013.01); *B01J 20/3204* (2013.01); *B01J 20/3236* (2013.01); *C02F 1/288* (2013.01); *C02F 1/281* (2013.01); *C02F 1/283* (2013.01); *C02F 2101/103* (2013.01); *C02F 2101/20* (2013.01)

(58) Field of Classification Search
CPC ........................................................ B01J 20/20
See application file for complete search history.

(56) References Cited

U.S. PATENT DOCUMENTS

| | | |
|---|---|---|
| 4,692,431 A | 9/1987 | Weller |
| 4,753,728 A | 6/1988 | Vanderbilt et al. |
| 4,859,386 A | 8/1989 | Vanderbilt et al. |
| 5,017,318 A | 5/1991 | Vanderbilt et al. |
| 6,368,504 B1 | 4/2002 | Kuennen et al. |
| 6,919,029 B2 | 7/2005 | Meng et al. |
| 7,473,369 B2 | 1/2009 | Meng et al. |
| 7,497,952 B2 | 3/2009 | Meng et al. |
| 9,751,785 B2 | 9/2017 | Doudrick et al. |
| 9,878,320 B2 | 1/2018 | Hristovski et al. |
| 10,427,194 B2 | 10/2019 | Westerhoff et al. |
| 10,435,311 B2 | 10/2019 | Hristovski et al. |
| 10,590,020 B2 | 3/2020 | Apul et al. |
| 10,787,374 B2 | 9/2020 | Perreault et al. |
| 10,793,449 B2 | 10/2020 | Westerhoff et al. |
| 10,823,649 B2 | 11/2020 | Westerhoff et al. |
| 10,927,016 B2 | 2/2021 | Hristovski et al. |
| 2009/0045106 A1 | 2/2009 | Kuennen et al. |
| 2013/0175220 A1 | 7/2013 | Hristovski et al. |
| 2016/0334311 A1 | 11/2016 | Westerhoff et al. |
| 2018/0080148 A1 | 3/2018 | Westerhoff et al. |
| 2019/0056363 A1 | 2/2019 | Westerhoff et al. |

(Continued)

FOREIGN PATENT DOCUMENTS

| | | |
|---|---|---|
| CN | 1751783 A | 3/2006 |
| CN | 102745792 A | 10/2012 |

(Continued)

OTHER PUBLICATIONS

Wagle, D., Shipley, H.J., 2016. Adsorption of Arsenic (V) to Titanium Dioxide Nanoparticles: Effect of Particle Size, Solid Concentration, and Other Metals. Environ. Eng. Sci. 33, 299-305. https://doi.org/10.1089/ees.2016.0014.

(Continued)

*Primary Examiner* — Stuart L Hendrickson

(74) *Attorney, Agent, or Firm* — Warner Norcross + Judd LLP

(57) ABSTRACT

A method for preparing a nano-enabled activated carbon block, a nano-enabled activated carbon block produced by the method, a household water filtration system comprising the nano-enabled activated carbon block, and a method for filtering tap water using the household water filtration system are provided. The method includes contacting a solution including a metal(lic) precursor (e.g. a titanium compound and/or an iron compound and/or a zirconium compound) with activated carbon particles such that the solution fills pores of the activated carbon particles. The method further includes causing a metal (hydr)oxide (e.g. titanium dioxide and/or zirconium dioxide and/or iron oxide) to precipitate from the solution thereby causing metal oxide nanoparticles to become deposited within pores of the activated carbon particles. The method also includes preparing a nano-enabled activated carbon block from the activated carbon particles having metal oxide nanoparticles deposited within the pores thereof.

11 Claims, 8 Drawing Sheets

(56) References Cited

U.S. PATENT DOCUMENTS

| | | |
|---|---|---|
| 2020/0158948 A1 | 5/2020 | Westerhoff et al. |
| 2021/0032130 A1 | 2/2021 | Westerhoff et al. |

FOREIGN PATENT DOCUMENTS

| | | |
|---|---|---|
| KR | 1020160114883 A | 10/2016 |
| WO | 2013088185 A1 | 6/2013 |

OTHER PUBLICATIONS

Sylvester, P., Westerhoff, P., Möller, T., Badruzzaman, M., Boyd, O., 2007. A Hybrid Sorbent Utilizing Nanoparticles of Hydrous Iron Oxide for Arsenic Removal from Drinking Water. Environ. Eng. Sci. 24, 104-112. https://doi.org/10.1089/ees.2007.24.104.

Badruzzaman, M., Westerhoff, P., Knappe, D.R.U., 2004. Intraparticle diffusion and adsorption of arsenate onto granular ferric hydroxide (GFH). Water Res. 38, 4002-4012. https://doi.org/10.1016/j.watres.2004.07.007.

Hristovski, K.D., Westerhoff, P.K., Möller, T., Sylvester, P., 2009. Effect of synthesis conditions on nano-iron (hydr) oxide impregnated granulated activated carbon. Chem. Eng. J. 146, 237-243. https://doi.org/10.1016/j.cej.2008.05.040.

Jain, A., 2011. Fabrication and Evaluation of Hematite Modified Granular Activated Carbon ( GAC ) Media for Arsenic Removal from Groundwater. Arizona State University.

Jain, A., Sanner, J., Sandoval, R., Hristovski, K., 2013. Activated Carbon for Removal of Arsenic and Organic Co-Contaminants, in: Novel Solutions to Water Pollution. American Chemical Soc, Washington, DC.

Hristovski, K.D., Markovski, J., 2017. Engineering metal (hydr)oxide sorbents for removal of arsenate and similar weak-acid oxyanion contaminants: A critical review with emphasis on factors governing sorption processes. Sci. Total Environ. 598, 258-271. https://doi.org/10.1016/j.scitotenv.2017.04.108.

Gifford, M., Hristovski, K., Westerhoff, P., 2017. Ranking traditional and nano-enabled sorbents for simultaneous removal of arsenic and chromium from simulated groundwater. Sci. Total Environ. 601-602, 1008-1014. https://doi.org/10.1016/j.scitotenv.2017.05.126.

Cooper, A.M., Hristovski, K.D., Möller, T., Westerhoff, P., Sylvester, P., 2010. The effect of carbon type on arsenic and trichloroethylene removal capabilities of iron (hydr)oxide nanoparticle-impregnated granulated activated carbons. J. Hazard. Mater. 183, 381-388. https://doi.org/10.1016/j.jhazmat.2010.07.036.

Asadullah, M., Jahan, I., Ahmed, M.B., Adawiyah, P., Malek, N.H., Rahman, M.S., 2014. Preparation of microporous activated carbon and its modification for arsenic removal from water. J. Ind. Eng. Chem. 20, 887-896. https://doi.org/10.1016/j.jiec.2013.06.019.

Gong, X.J., Li, W.G., Zhang, D.Y., Fan, W.B., Zhang, X.R., 2015. Adsorption of arsenic from micro-polluted water by an innovative coal-based mesoporous activated carbon in the presence of coexisting ions. Int. Biodeterior. Biodegrad. 102, 256-264. https://doi.org/10.1016/j.ibiod.2015.01.007.

Muñiz, G., Fierro, V., Celzard, A., Furdin, G., Gonzalez-Sánchez, G., Ballinas, M.L., 2009. Synthesis, characterization and performance in arsenic removal of iron-doped activated carbons prepared by impregnation with Fe(III) and Fe(II). J. Hazard. Mater. 165, 893-902. https://doi.org/10.1016/j.jhazmat.2008.10.074.

Fierro, V., Muñiz, G., Gonzalez-Sánchez, G., Ballinas, M.L., Celzard, A., 2009. Arsenic removal by iron-doped activated carbons prepared by ferric chloride forced hydrolysis. J. Hazard. Mater. 168, 430-437. https://doi.org/10.1016/j.jhazmat.2009.02.055.

Hristovski, K., Baumgardner, A., Westerhoff, P., 2007. Selecting metal oxide nanomaterials for arsenic removal in fixed bed columns: From nanopowders to aggregated nanoparticle media. J. Hazard. Mater. 147, 265-274. https://doi.org/10.1016/j.jhazmat.2007.01.017.

Sandoval, R., Cooper, A.M., Aymar, K., Jain, A., Hristovski, K., 2011. Removal of arsenic and methylene blue from water by granular activated carbon media impregnated with zirconium dioxide nanoparticles. J. Hazard. Mater. 193, 296-303. https://doi.org/10.1016/j.jhazmat.2011.07.061.

Pulisova, P., Bohacek, J., Subrt, J., Szatmary, L., Bezdicka, P., Vecernikova, E., Balek, V. Thermal behaviour of titanium dioxide nanoparticles prepared by precipitation from aqueous solutions. Journal of Thermal Analysis and Calorimetry (2010) 101:607-613.

Ngmata, S., Boonprakob, N., Wetchakun, N., Ounnunkad, K., Phanichphant, S., Inceesungvom, B. A facile synthesis of nanocrystalline anatase $TiO_2$ from $TiOSO_4$ aqueous solution. Materials Letters, vol. 105, Aug. 15, 2013, pp. 76-79.

Long, S.E., Martin, T.D., Martin, E.R. Determination of Trace Elements in Waters and Wastes by Inductively Coupled Plasma-Mass Spectrometry. Environmental Monitoring Systems Laboratory Office of Research and Development, U.S. Environmental Protection Agency (1990).

Gupta, S.M., Tripathi, M. A review on the synthesis of $TiO_2$ nanoparticles by solution route. Cent. Eur. J. Chem. 10(2), 2012, pp. 279-294.

Zhang, P., Lai, S., Liu, F., Yang, Z., Zhou, W. Preparation of Nano-sized $TiO_2$ Supported on Granular Activated Carbon and the Photocatalytic Degradation of Methylene Blue. Advanced Materials Research, 2012, vol. 508, pp. 188-191.

Metals by Inductively Coupled Plasma-Mass Spectrometry, Standard Methods Committee, 2009, Joint Task Group: 22 Edition, https://doi.org/10.2105/SMWW.2882.048.

Machine assisted English translation of CN1751783A obtained from https://patents.google.com on Aug. 1, 2019, 6 pages.

Machine assisted English translation of CN102745792A obtained from https://patents.google.com on Aug. 1, 2019, 6 pages.

Machine assisted English translation of KR20160114883A obtained from https://patents.google.com on Aug. 1, 2019, 7 pages.

U.S. Appl. No. 17/137,790, filed Dec. 30, 2020, Westerhoff et al.

NANO-ENABLED ACTIVATED CARBON BLOCKS TO ENABLE REMOVAL OF OXYANIONS FROM WATER

FIELD OF THE INVENTION

This disclosure provides for methods for preparing nano-enabled activated carbon blocks having metal (hydr)oxide (e.g. titanium dioxide and/or iron hydroxide and/or zirconium (hydr)oxide) nanoparticles deposited within the pores thereof, a method for treating water using the nano-enabled activated carbon blocks, and nano-enabled activated carbon blocks produced by the methods. This disclosure further provides for a household water filtration system comprising the nano-enabled activated carbon blocks and a method of filtering water using the household water filtration system.

BACKGROUND OF THE INVENTION

Heavy metal oxyanions, including arsenate, are common contaminants of household tap water. A number of point-of-use (POU) carbon-based filtration devices have been developed to remove oxyanions from drinking water. However, carbon alone will not remove significant amounts of oxyanions from water; therefore, the carbon-based filtration devices are commonly impregnated with iron oxide, which has an affinity for aqueous arsenate and can sequester arsenate from tap water. Common methods employed to remove oxyanions from water also make use of specific sorptive medias (e.g., BAYOXIDE E33) or ion exchange medias (e.g., PUROLITE FERRIX A33E) in column based systems.

Previous POU carbon-based filtration devices suffer from several limitations that remain to be successfully addressed. For example, the devices tend to leach iron into water, have a limited capacity to remove arsenic, utilize difficult-to-handle loose media, and/or fail to adequately secure iron oxide within the media matrix, thereby leading to a leaching of iron into an effluent. Additionally, previous POU carbon-based filtration devices suffer from a limited capacity for absorbing oxyanions, tend to leach oxyanions as absorptive capacity is reached, and/or are column systems that are not consumer-friendly.

While various efforts have been made, there remains an opportunity to provide improved methods for producing activated carbon blocks capable of removing oxyanions from household tap water. There also remains an opportunity to provide improved activated carbon blocks and systems and methods utilized such activated carbon blocks.

BRIEF SUMMARY OF THE INVENTION

Disclosed are methods of preparing nano-enabled activated carbon blocks. The nano-enabled activated carbon blocks have metal (hydr)oxide (e.g. titanium dioxide and/or iron hydroxide and/or zirconium (hydr)oxide) nanoparticles deposited within the pores thereof. The nanoparticles can comprise one type of metal oxide, one type of metal hydroxide, can comprise a combination of at least one type of metal oxide and at least one type of metal hydroxide, or can comprise a combination of two or more types of metal oxides and/or can comprise a combination of two or more types of metal hydroxides.

In a first general embodiment, the nano-enabled activated carbon block includes activated carbon defining pores and titanium dioxide ($TiO_2$) particles disposed in the pores. In a second general embodiment, the nano-enabled activated carbon block includes activated carbon defining pores and iron hydroxide ($Fe(OH)_3$) particles disposed in the pores. In a third general embodiment, the nano-enabled activated carbon block includes activated carbon defining pores and zirconium (hydr)oxide (e.g. zirconium dioxide) particles disposed in the pores.

In one embodiment, the preparation method includes providing an aqueous solution including a hydrolyzable titanium compound and providing activated carbon particles. The method further comprises combining the aqueous solution and the activated carbon particles to form a slurry. The method also includes heating the slurry to a temperature of from about 80° C. to about 95° C. such that the hydrolyzable titanium compound hydrolyzes within the pores of the activated carbon particles to become deposited within the pores of the activated carbon particles as nanoparticles thereby producing precursor nano-enabled activated carbon particles. Optionally, following heating of the slurry, the $TiO_2$ substantially conforms to an amorphous or non-anatase crystalline structure in certain embodiments. It is to be appreciated that the present invention is not limited to a particular crystalline structure. Without being bound or limited to any particular theory, it is thought that certain crystalline structures may be present or imparted in certain embodiments. However, in other embodiments, such crystalline structures may not be present or imparted. The method includes rinsing the precursor nano-enabled activated carbon particles with water to remove byproducts and/or impurities therefrom. The method also includes rinsing the precursor nano-enabled activated carbon particles with a neutralizing agent to neutralize the precursor nano-enabled activated carbon particles. The method further includes drying the precursor nano-enabled activated carbon particles.

In an embodiment related to the one immediately above, a hydrolyzable metal precursor compound (e.g. a compound comprising zirconium and/or other metal(s) similar to titanium) is used in place of, or in addition to, the hydrolyzable titanium compound. As such, after heating, the hydrolyzable metal precursor compound hydrolyzes within the pores of the activated carbon particles to become deposited within the pores of the activated carbon particles as nanoparticles thereby producing precursor nano-enabled activated carbon particles.

In another embodiment, the preparation method includes providing an activated carbon block formed from activated carbon particles and a binder. The method further includes providing an aqueous solution comprising a hydrolyzable titanium compound and contacting the activated carbon block and the aqueous solution to fill the pores with the aqueous solution. The method also includes heating the aqueous solution to a temperature of from about 80° C. to about 95° C. such that the hydrolyzable titanium compound hydrolyzes within the pores of the activated carbon particles to become deposited within the pores of the activated carbon particles as nanoparticles thereby forming a nano-enabled activated carbon block intermediate. Optionally, following heating of the aqueous solution, the $TiO_2$ substantially conforms to an amorphous or non-anatase crystalline structure in certain embodiments. The method further includes rinsing the nano-enabled activated carbon block intermediate with water to remove byproducts and/or impurities therefrom and rinsing the nano-enabled activated carbon block intermediate with a neutralizing agent to neutralize the nano-enabled activated carbon block intermediate. The method also includes heating the nano-enabled activated carbon block intermediate to a temperature of from about 175° C. to about 205° C. thereby producing the nano-enabled activated carbon block. Optionally, following heating of the nano-enabled activated carbon block intermediate, the $TiO_2$ substantially conforms to an anatase crystalline structure in certain embodiments.

In an embodiment related to the one immediately above, a hydrolyzable metal precursor compound (e.g. a compound comprising zirconium and/or other metal(s) similar to titanium) is used in place of, or in addition to, the hydrolyzable titanium compound. As such, after heating, the hydrolyzable metal precursor compound hydrolyzes within the pores of the activated carbon particles to become deposited within the pores of the activated carbon particles as nanoparticles thereby forming a nano-enabled activated carbon block intermediate.

In yet another embodiment, the preparation method includes providing a solution comprising anhydrous iron trichloride ($FeCl_3$) and an alcohol. The method further includes providing activated carbon particles and combining the solution and the activated carbon particles to form a slurry. The method also includes raising the pH of the slurry to about 12 such that $Fe(OH)_3$ precipitates out of the solution producing nano-enabled activated carbon particles including the activated carbon particles with $Fe(OH)_3$ nanoparticles deposited within the pores thereof. The method includes the step of rinsing the nano-enabled activated carbon particles with water to remove byproducts and/or impurities therefrom and rinsing the nano-enabled activated carbon particles with a neutralizing agent to neutralize the nano-enabled activated carbon particles. The method also includes drying the nano-enabled activated carbon particles.

In yet another embodiment, the preparation method includes providing an activated carbon block formed from activated carbon particles and a binder and providing a solution comprising anhydrous $FeCl_3$ and an alcohol. The method further includes contacting the activated carbon block and the solution to fill the pores with the solution. The method also includes raising pH of the solution to about 12 such that $Fe(OH)_3$ precipitates out to form the nano-enabled activated carbon block comprising the activated carbon with $Fe(OH)_3$ nanoparticles deposited within pores thereof. The method also includes rinsing the nano-enabled activated carbon block intermediate with water to remove byproducts and/or impurities therefrom and rinsing the nano-enabled activated carbon block with a neutralizing agent to neutralize the nano-enabled activated carbon block.

In addition, a nano-enabled activated carbon block prepared according to any one of the above methods, and a household water filtration system comprising the nano-enabled activated carbon block, are also disclosed.

Moreover, a method of filtering water is disclosed. The method includes providing the household water filtration referenced above and flowing tap water through the filtration system. The concentration of a metal oxyanion in water exiting the filtration system is equal to or lower than that in tap water entering the filtration system.

The nano-enabled activated carbon blocks including metal-oxide nanoparticles deposited within the pores thereof and produced by the methods disclosed herein overcome many of the limitations of previous POU carbon-based filtration devices. For example, the nano-enabled activated carbon blocks have a dual functionality wherein the blocks may remove both oxyanions and small organic molecules from tap water simultaneously and the blocks have a higher oxyanion absorptive capacity than those produced according to previously known methods. Moreover, the nano-enabled activated carbon blocks have a reduced tendency relative to blocks produced by alternative methods to leach bound arsenate or metal oxides (e.g., $TiO_2$ or $Fe(OH)_3$ or zirconium (hydr)oxide) into effluent water.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

Other advantages of the disclosure will be readily appreciated, as the same becomes better understood by reference to the following detailed description when considered in connection with the accompanying drawings wherein.

DETAILED DESCRIPTION OF THE INVENTION

Figure 1:
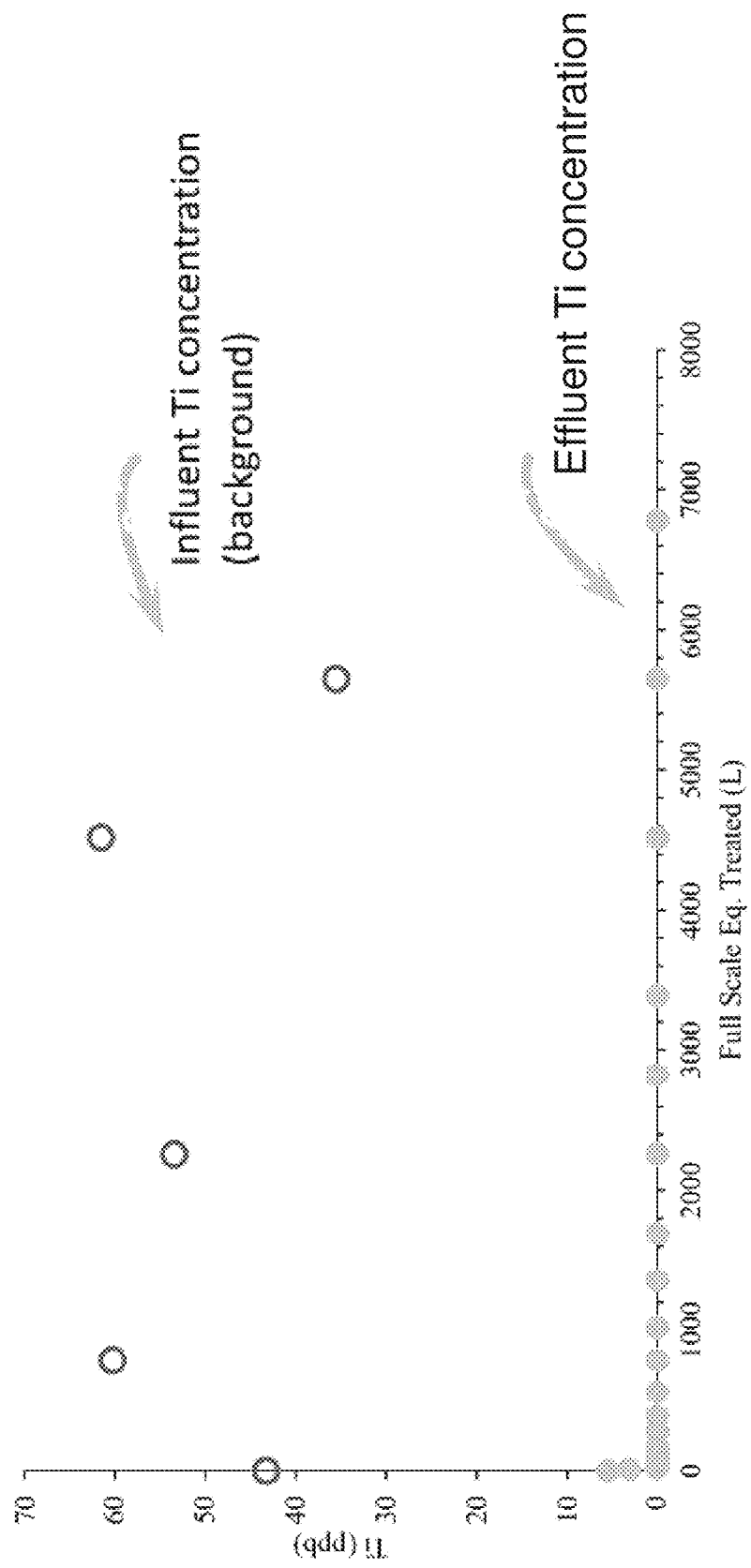
FIG. 1 is a scatter plot showing that Ti does not leach from a nano-enabled activated carbon block including titanium dioxide nanoparticles.

A nano-enabled activated carbon block is disclosed. The nano-enabled activated carbon block includes activated carbon particles, a binder, and metal (hydr)oxide nanoparticles.

The activated carbon block is a continuous block of activated carbon particles bonded together by a conventional carbon block binder. The binder is a polymeric material with a very low melt index (melt flow rate) such as, for example, an ultra-high molecular weight, high density polyethylene. Examples of suitable binders are disclosed in U.S. Pat. Nos. 4,753,728, 4,859,386, and 5,017,318, the subject matter of which is incorporated herein by reference.

A binder in accordance with the present invention comprises a polymeric material with a very low melt index (melt flow rate) which becomes tacky at elevated temperatures without becoming sufficiently liquid to significantly wet a surface of the activated carbon particles. The melt flow rate or melt index as determined by ASTM D1238 or DIN 53735 at 190° C. and 15 kg load should be less than about 1 gram/10 minutes, less than 0.5 grams/10 minutes, or less than 0.1 gram/10 minutes. Optionally, the binder is an ultra-high molecular weight, high density polyethylene. An example of a suitable commercially available ultra-high molecular weight, high density polyethylene is HOSTALEN GUR-212, which has a density of 0.935 grams per cubic centimeter and a melt index of less than 0.1 grams per ten minutes as determined by DIN 53735 at 190/15. Such polyethylenes have a molecular weight of from about 4 to about 6 million. In various embodiments, suitable polyethylenes have a Vicat softening temperature of approximately 74° C. and a crystalline melting range of 135° C. to 138° C.

The temperature at which the binder becomes sufficiently tacky to adhere to the carbon particles may vary depending on the specific polymer used. With high molecular weight, high density polyethylene, the binder and carbon particles can be processed, as described further below, at a temperature of from about 175° C. to about 205° C. for up to about 2 hours.

The percentage of the binder used to bind the activated carbon particles is from about 17 wt. % to about 25 wt. %, optionally from about 20 wt. % to about 30 wt. %, and optionally about 20 wt. % or about 25 wt. % based on the combined weight of the activated carbon particles (or nano-enabled activated carbon particles described further below) and binder. Enough binder should be used to hold the carbon particles together, but not so much as to block the surface pores of the carbon particles. The binder may be utilized in powder form so that it can be uniformly mixed and dispersed with the activated carbon particles.

The activated carbon particles include an activated carbon particle size distribution. Activated carbon particle size distributions suitable for the present invention are disclosed in U.S. Pat. No. 6,368,504 B1, the subject matter of which is incorporated herein by reference. Activated carbon particle size and size distribution can be described in terms of mesh sizes as measured using a wet sieve analysis. A wet sieve analysis is a process in which an activated carbon particle mixture is separated into ranges or "bins" based on particle size. In general, the activated carbon particle mixture is passed, with the aid of water, sequentially through a series of screens, each with progressively smaller openings, down to a 500 mesh screen. Particles larger than the opening size of a specific screen will remain atop that screen while smaller particles will pass through the screen to the next smaller screen. Particles smaller than the openings of 500 mesh screen are typically referred to as "fines." The level of fines can vary significantly from carbon mixture to carbon mixture, and in some carbon mixtures may comprise as much as 20% by weight. Fines are typically disregarded by carbon producers in grading activated carbon particle mixtures. In this disclosure, including the claims, fines are considered for purposes of particle size distribution, but are disregarded for purposes of mean particle diameter. According to conventional mesh size notation, the notation "+" in front of a mesh size refers to particles too large to pass through a screen of the noted size. For example, +140 mesh refers to particles that are too large to pass through a screen of 140 mesh size. Similarly, the notation "−" in front of a mesh size refers to particles small enough to pass through a screen of the noted size. For example, −500 mesh refers to particles that are small enough to pass through a screen of 500 mesh size. Using this notation, the term "fines" refers to −500 mesh carbon particles. In referring to particle distributions, the notation "×" between two mesh sizes refers to a range of sizes. For example, 140×200 refers to a range or bin of carbon particle sizes smaller than 140 mesh and greater than 200 mesh.

Although the present invention is described in connection with a specific particle size distribution and mean particle diameter, the present invention is intended to encompass a range of carbon mixtures in which the mean particle diameter and particle size distribution vary somewhat from a described embodiment. More specifically, the present invention is directed to activated carbon particle mixtures in which the mean particle diameter ranges between approximately 60 microns (μm) and 80 microns, and in which the +140 mesh particles and the −500 mesh particles are each less than approximately 10 wt. % of the particle size distribution, wherein wt. % is measured with respect to a total mass of the activated carbon particles (alternatively, a total mass of the activated carbon). The mean particle diameter is, however, optionally about 65 to about 75 microns, and further optionally about 70 microns. The +140 mesh particles and the −500 mesh may each make up less than approximately 8% of the particle size distribution, and optionally each make up less than approximately 7% and 7.5%, respectively, of the activated carbon particle size distribution. The activated carbon particle diameter and particle size distribution should provide an optimal balance of filtration performance, flow rate, production yield and hardness. In various embodiments, the activated carbon particle size distribution is such that a weight percentage of +140 mesh activated carbon particles based on total weight of activated carbon particles is less than 5 wt. % and a percentage of −500 mesh activated carbon particles is approximately 7.5 wt. %.

In various embodiments, the nano-enabled activated carbon block is manufactured using a method and apparatus as disclosed in U.S. Pat. No. 6,368,504 B1, the subject matter of which is incorporated herein by reference. In general, the method includes mixing the binder (in powder form) and activated carbon particles (or precursor activated carbon particles or nano-enabled activated carbon particles, both described further below) uniformly to form a mass where in the mass the binder is uniformly dispersed throughout the activated carbon particles. The method also includes feeding the mass into a conventional mold. The method in various embodiments further includes heating the mold and its contents to a temperature from about 175° C. to about 205° C. The method includes subjecting the mass at the temperature just specified to about 30 to about 120 psi pressure via a conventional pressure piston, which is lowered into the mold, producing a nano-enabled activated carbon block or an activated carbon block. The method further includes cooling the nano-enabled activated carbon block or the activated carbon block, and removing the block from the mold. Optionally, nano-enabled activated carbon block is manufactured using any of various extruders and extrusion processes known in the art and suitable for forming activated carbon blocks.

The activated carbon particles are referred to as "nano-enabled activated carbon particles" when the activated carbon particles include active metal oxide nanoparticles within pores defined by the activated carbon particles. Examples of suitable metal oxides include titanium dioxide ($TiO_2$) and iron hydroxide ($Fe(OH)_3$) and zirconium (hydr)oxide (e.g. $ZrO_2$) and other metal (hydr)oxides similar to these. One of skill in the art will appreciate that the method of this invention can be used for other metal (hydr)oxides not expressly described herein, such as those having chemistries similar to those described above.

"Active metal oxide" is used herein to refer to a target crystal form of a metal oxide capable of effectively absorbing oxyanions from an aqueous solution, as described further below. For example, in the case of titanium dioxide, titanium dioxide can conform to a number of crystal structures including amorphous, rutile, anatase, and brookite. Again however, it is to be appreciated that the present invention is not limited to a particular crystalline structure. Without being bound or limited to any particular theory, it is thought that certain crystalline structures may be present or imparted in certain embodiments. However, in other embodiments, such crystalline structures may not be present or imparted. In general, "conforming substantially" is to be understood to mean that not less than about 85 wt. %, about 90 wt. %, about 95 wt. %, or about 99 wt. % of the titanium dioxide with respect to a total weight of the titanium dioxide conforms to a given crystal structure to which the titanium dioxide is considered to conform substantially. In other embodiments, an alternate crystalline form of titanium dioxide is to be considered the active form of titanium dioxide. In various embodiments, any crystal form or mixture thereof of iron oxide is to be considered to be active; however, optionally a particular crystal structure of iron oxide may be considered the target, or active, form, such as rhombohedral, cubic bixbyite, cubic spinel, or orthorhombic. Activated carbon particles including metal oxide nanoparticles that are not yet active, as that term has just been defined, are referred to as "precursor nano-enabled activated carbon particles."

The metal oxide nanoparticles have particle diameters ranging from about 1 nm to about 200 nm, from about 1 nm to about 150 nm, from about 1 nm to about 100 nm, from about 1 nm to about 50 nm, from about 1 nm to about 30 nm, from about 5 nm to about 10 nm, or from about 1 nm to about 10 nm. Metal oxide nanoparticles having particle diameters falling within a given range optionally include less than about 10 wt. %, less than about 5 wt. %, or less than 1 wt. % of particles falling outside the given range based on a total weight of the metal oxide nanoparticles.

A household water filtration system is disclosed. The household water filtration system includes the nano-enabled activated carbon block. The term "household water filtration system" may be understood to include all of a variety of point-of-use (POU) forms of household water filtration systems known in the art including but not limited to refrigerator water filters, water filtration pitchers, and faucet water filters.

Optionally, the household water filtration system is configured such that water passing through the filtration system has an average retention time of about 1 second, about 2 seconds, about 3 seconds, about 4 seconds, about 5 seconds, or about 10 seconds or less within the household water filtration system. Optionally, the household water filtration system is in communication with a faucet of a household sink.

A method of filtering water is disclosed. The method includes providing the household water filtration system and flowing tap water through the household water filtration system such that a concentration of a metal oxyanion or heavy metal in water exiting the filtration system is equal to or lower than that in the tap water entering the filtration system.

The heavy metal oxyanion may include various water-soluble or water-insoluble derivatives and forms of heavy metals including antimony, arsenic(III), arsenic(V), barium, cadmium, cesium, chromium, cobalt, copper, gallium, gold, iron, lead, manganese, mercury, molybdenum, nickel, platinum, radium, selenium, silver, strontium, tellurium, tin, tungsten, uranium, vanadium, zinc, and low-molecular weight organic arsenic compounds, such as monomethylarsonic acid, dimethylarsinic acid and phenylarsonic acid. Further examples of metal oxyanions or heavy metals include arsenite (As(III)), arsenate (As(V)) and the dissolved metals: cadmium, chromium, copper, lead, mercury, tungsten, uranium and zinc.

Optionally, the nano-enabled activated carbon block has a capacity to absorb at least about 100 μg, about 200 μg, about 300 μg, about 350 μg, about 400 μg, about 500 μg, or about 600 μg of a heavy metal (in the case of oxyanions, it is the heavy metal component of the oxyanion that the masses refer to and not, for example, an oxygen component) from an aqueous solution per gram of the nano-enabled activated carbon block. Optionally, the heavy metal is absorbed from an aqueous solution having a pH of about 7.5, about 6, about 5, about 4, about 8, about 9, about 9.5, or about 10 and the aqueous solution is placed in contact with the nano-enabled activated carbon block. Optional upper bounds on the pH of the aqueous solution include a pH of about 6, about 5, about 4, about 8, about 9, about 9.5, about 10, or about 11. Optionally, the aqueous solution includes at least approximately 100 ppb, 50 ppb, 10 ppb, 150 ppb, or 200 ppb of the heavy metal prior to contacting the nano-enabled activated carbon block. Optionally, the heavy metal is in a form selected from the group consisting of arsenate, arsenite, arsenic, and mixtures thereof.

The nano-enabled activated carbon block can include various amounts of metal oxide nanoparticles. For example, the nano-enabled activated carbon block can optionally include at least about 5 wt. %, at least about 10 wt. %, at least about 15 wt. %, at least about 20 wt. %, or about 8 wt. % active metal oxide nanoparticles measured with respect to a weight of the nano-enabled activated carbon block when the metal oxide is titanium dioxide. Optional upper bounds for the titanium dioxide nanoparticles in the nano-enabled activated carbon block include 10 wt. %, 15 wt. %, 20 wt. %, and 25 wt. % measured with respect to a weight of the nano-enabled activated carbon block. As a further example, the nano-enabled activated carbon block can optionally include at least about 10 wt. %, at least about 15 wt. %, at least about 20 wt. %, at least about 25 wt. %, or about 26 wt. % active metal oxide nanoparticles measured with respect to a weight of the nano-enabled activated carbon block when the metal oxide is ferric hydroxide (iron hydroxide). Optional upper bounds for the iron hydroxide nanoparticles in the nano-enabled activated carbon block include, 15 wt. %, 20 wt. %, 25 wt. %, 27 wt. %, 30 wt. %, and 35 wt. % measured with respect to a weight of the nano-enabled activated carbon block.

A method of preparing a nano-enabled activated carbon block is disclosed. The nano-enabled activated carbon blocks have metal (hydr)oxide (e.g. titanium dioxide and/or iron hydroxide and/or zirconium (hydr)oxide) nanoparticles deposited within the pores thereof. The nanoparticles can comprise one type of metal oxide, one type of metal hydroxide, can comprise a combination of at least one type of metal oxide and at least one type of metal hydroxide, or can comprise a combination of two or more types of metal oxides and/or can comprise a combination of two or more types of metal hydroxides.

In a first embodiment, the nano-enabled activated carbon block includes activated carbon defining pores and $TiO_2$ nanoparticles disposed in the pores. The method includes providing a solution comprising a thermally hydrolyzable titanium compound. Optionally, the solution is an aqueous solution, optionally the solution includes an inorganic solvent or an organic solvent such as an alcohol including methanol. Examples of hydrolyzable titanium compounds include titanium trichloride, titanium tetrachloride, titanyl sulfate ($TiOSO_4$), titanium sulfate, titanium iron sulfate, and titanium oxychloride. Titanium alkoxides may also be used including titanium ethoxide, titanium ethylhexoxide, titanium isobutoxide, titanium isopropoxide, titanium isopropylate or titanium methoxide.

The method further includes providing activated carbon particles and combining the solution and the activated carbon particles to form a slurry. The method also includes heating the slurry to a temperature of from about 60° C. to about 99° C., from about 70° C. to about 95° C., from about 80° C. to about 95° C., or from about 85° C. to about 90° C. such that the hydrolyzable titanium compound hydrolyzes (by thermally assisted hydrolysis) within the pores of the activated carbon particles to become deposited within the pores of the activated carbon particles as nanoparticles thereby producing either precursor nano-enabled activated carbon particles or nano-enabled activated carbon particles. When precursor nano-enabled activated carbon particles are produced, optionally, following heating of the slurry, the $TiO_2$ substantially conforms to an amorphous or otherwise non-anatase crystalline structure in certain embodiments.

The method includes rinsing the precursor nano-enabled activated carbon particles with a solvent, optionally water, to remove byproducts and/or impurities therefrom. Impurities may include, for example, sulfuric acid. The method also includes rinsing the precursor nano-enabled activated carbon particles with a neutralizing agent to neutralize the precursor nano-enabled activated carbon particles. Suitable neutralizing agents include various buffered solutions including sodium bicarbonate-buffered solutions, organic buffer solutions, as well as strong bases (e.g., NaOH or KOH) or acids (e.g., HCl). Optionally, the pH of the buffer is about 4, 5, 6, 7, 8, 9, or 10. Optional upper bounds on the pH of the buffer include about 5, 6, 7, 8, 9, 10, and 11. Optionally, the precursor nano-enabled activated carbon particles are rinsed from about 1, 2, 3, 4, or 5 times with water and, optionally, the precursor nano-enabled activated carbon particles are rinsed from about 1, 2, 3, 4, or 5 times with the neutralizing agent. The method includes drying the precursor nano-enabled activated carbon particles.

The method further includes combining the precursor nano-enabled activated carbon particles with a binder to form a mass and then using the mass to prepare a nano-enabled activated carbon block as described above. Optionally, following heating of the mass, the $TiO_2$ substantially conforms to an anatase crystalline structure in certain embodiments.

In an embodiment related to the first embodiment above, a hydrolyzable metal precursor compound (e.g. a compound comprising zirconium and/or other metal(s) similar to titanium) is used in place of, or in addition to, the hydrolyzable titanium compound. As such, after heating, the hydrolyzable metal precursor compound hydrolyzes within the pores of the activated carbon particles to become deposited within the pores of the activated carbon particles as nanoparticles thereby producing precursor nano-enabled activated carbon particles.

Examples of hydrolyzable zirconium compounds include zirconium trichloride, zirconium tetrachloride, zirconium sulfate ($ZrOSO_4$), zirconium sulfate, zirconium iron sulfate, and zirconium oxychloride. zirconium alkoxides may also be used including zirconium ethoxide, zirconium ethylhexoxide, zirconium isobutoxide, zirconium isopropoxide, zirconium isopropylate or zirconium methoxide.

A second embodiment of the method of preparing a nano-enabled activated carbon block is disclosed. The nano-enabled activated carbon block includes activated carbon defining pores and $TiO_2$ nanoparticles disposed in the pores. The second embodiment of the method differs from the first primarily in that the activated carbon particles are first used to manufacture an activated carbon block according to the method disclosed above (i.e., providing an activated carbon block formed from activated carbon particles and a binder) prior to being contacted with the solution including the hydrolyzable titanium compound.

The method includes contacting the solution including the hydrolyzable titanium compound with the activated carbon block to fill the pores with the solution. The method also includes heating the solution and the activated carbon block to a temperature of from about 60° C. to about 99° C., from about 70° C. to about 95° C., from about 80° C. to about 95° C., or from about 85° C. to about 90° C. such that the hydrolyzable titanium compound hydrolyzes within the pores of the activated carbon particles to become deposited within the pores of the activated carbon particles as nanoparticles thereby producing either a nano-enabled activated carbon block intermediate or the nano-enabled activated carbon block. When the nano-enabled activated carbon block intermediate is produced, optionally, following heating of the slurry, the $TiO_2$ substantially conforms to an amorphous or otherwise non-anatase crystalline structure in certain embodiments.

The method includes rinsing the nano-enabled activated carbon block intermediate with a solvent, optionally water, to remove byproducts and/or impurities therefrom. Impurities may include, for example, sulfuric acid. The method also includes rinsing the nano-enabled activated carbon block intermediate with a neutralizing agent to neutralize the nano-enabled activated carbon block intermediate. Suitable neutralizing agents include various buffered solutions including sodium bicarbonate-buffered solutions, organic buffer solutions, as well as strong bases (e.g., NaOH or KOH) or acids (e.g., HCl). Optionally, the pH of the buffer is about 4, 5, 6, 7, 8, 9, or 10. Optional upper bounds on the pH of the buffer include about 5, 6, 7, 8, 9, 10, and 11. Optionally, the nano-enabled activated carbon block intermediate is rinsed from about 1, 2, 3, 4, or 5 times with water and, optionally, the precursor nano-enabled activated carbon block intermediate is rinsed from about 1, 2, 3, 4, or 5 times with the neutralizing agent. The method optionally includes drying the nano-enabled activated carbon block intermediate.

The method further includes heating the nano-enabled activated carbon block intermediate to a temperature of from about 100° C. to about 210° C., from about 125° C. to about 205° C., from about 150° C. to about 190° C., or from about 175° C. to about 180° C. Optionally, following heating of the nano-enabled activated carbon block intermediate, the $TiO_2$ substantially conforms to an anatase crystalline structure in certain embodiments.

In an embodiment related to the second embodiment above, a hydrolyzable metal precursor compound (e.g. a compound comprising zirconium and/or other metal(s) similar to titanium) is used in place of, or in addition to, the hydrolyzable titanium compound. As such, after heating, the hydrolyzable metal precursor compound hydrolyzes within the pores of the activated carbon particles to become deposited within the pores of the activated carbon particles as nanoparticles thereby forming a nano-enabled activated carbon block intermediate.

A third embodiment of the method of preparing a nano-enabled activated carbon block is disclosed. The nano-enabled activated carbon block includes activated carbon defining pores and $Fe(OH)_3$ particles disposed in the pores.

The method includes providing a solution including anhydrous iron trichloride ($FeCl_3$). Optionally, the solution includes methanol, optionally the solution includes an inorganic solvent or an organic solvent other than or in addition to methanol, optionally the solution includes water. Optionally, the solution includes an alternative or additional iron compound including, for example, an alternative ferric halide compound (e.g., $FeFl_3$), ferrous sulfate, ferrous carbonate, ferrous bicarbonate, or any iron compound known in the art and suitable for use in the method.

The method further includes providing activated carbon particles and combining the solution and the activated carbon particles to form a slurry. The method also includes raising the pH of the slurry to about 8, about 9, about 10, about 11, or about 12 such that $Fe(OH)_3$ precipitates out of the solution (by pH mediated precipitation) producing nano-enabled activated carbon particles including the activated carbon particles with $Fe(OH)_3$ nanoparticles deposited within the pores of the activated carbon particles. Optional upper bounds on the pH to which the slurry is raised include about 9, about 10, about 11, and about 12.

The method includes rinsing the nano-enabled activated carbon particles with a solvent, optionally water, to remove byproducts and/or impurities therefrom. The method also includes rinsing the nano-enabled activated carbon particles with a neutralizing agent to neutralize the nano-enabled activated carbon particles. Suitable neutralizing agents include various buffered solutions including sodium bicarbonate-buffered solutions, organic buffer solutions, as well as strong bases (e.g., NaOH or KOH) or acids (e.g., HCl). Optionally, the pH of the buffer is about 4, 5, 6, 7, 8, 9, or 10. Optional upper bounds on the pH of the buffer include about 5, 6, 7, 8, 9, 10, and 11. Optionally, the nano-enabled activated carbon particles are rinsed from about 1, 2, 3, 4, or 5 times with water and, optionally, the precursor nano-enabled activated carbon particles are rinsed from about 1, 2, 3, 4, or 5 times with the neutralizing agent. The method includes drying the nano-enabled activated carbon particles.

The method further includes combining the nano-enabled activated carbon particles with a binder to form a mass and then using the mass to prepare a nano-enabled activated carbon block as described above.

A fourth embodiment of the method of preparing a nano-enabled activated carbon block is disclosed. The nano-enabled activated carbon block includes activated carbon defining pores and $Fe(OH)_3$ particles disposed in the pores. The fourth embodiment of the method differs from the third primarily in that the activated carbon particles are first used to manufacture an activated carbon block according to the method disclosed above (i.e., providing an activated carbon block formed from activated carbon particles and a binder) prior to being contacted with the solution including the anhydrous $FeCl_3$.

The method includes contacting the solution comprising the anhydrous $FeCl_3$ with the activated carbon block to fill the pores with the solution. The method also includes raising the pH of the solution comprising the anhydrous $FeCl_3$ and disposed within the pores to about 8, about 9, about 10, about 11, or about 12 such that $Fe(OH)_3$ precipitates out of the solution producing a nano-enabled activated carbon block including the activated carbon particles with $Fe(OH)_3$ nanoparticles deposited within the pores of the activated carbon particles. Optional upper bounds on the pH to which the solution is raised include about 9, about 10, about 11, and about 12.

The method includes rinsing the nano-enabled activated carbon block with a solvent, optionally water, to remove byproducts and/or impurities therefrom. The method also includes rinsing the nano-enabled activated carbon block with a neutralizing agent to neutralize the nano-enabled activated carbon block. Suitable neutralizing agents include various buffered solutions including sodium bicarbonate-buffered solutions, organic buffer solutions, as well as strong bases (e.g., NaOH or KOH) or acids (e.g., HCl). Optionally, the pH of the buffer is about 4, 5, 6, 7, 8, 9, or 10. Optional upper bounds on the pH of the buffer include about 5, 6, 7, 8, 9, 10, and 11. Optionally, the nano-enabled activated carbon block is rinsed about 1, 2, 3, 4, or 5 times with water and, optionally, the nano-enabled activated carbon block is rinsed about 1, 2, 3, 4, or 5 times with the neutralizing agent. The method optionally includes drying the nano-enabled activated carbon block.

Optionally, any one of the above-disclosed embodiments of a method of preparing a nano-enabled activated carbon block includes flushing the nano-enabled activated carbon block with a solvent, optionally water, optionally tap water. Optionally, the nano-enabled activated carbon block is flushed with from about 1, about 10, about 25, about 50, about 75, about 100, about 150, about 175, about 200, about 250, about 300, about 400, about 450, about 500, about 600, about 700, about 800, about 900, about 1000, about 1100, about 1250, or about 1300 block volumes of a solvent (e.g., water or tap water). Optional upper limits on the amount of solvent used to flush the nano-enabled activated carbon block include about 10, about 25, about 50, about 75, about 100, about 150, about 175, about 200, about 250, about 300, about 400, about 450, about 500, about 550, about 750, about 1000, and about 1500 block volumes. "Block volume" is understood to refer to a volume occupied by the nano-enabled activated carbon block.

It is to be understood that it is not out of keeping with the spirit of the present invention to prepare nano-enabled activated carbon blocks including both titanium dioxide and/or zirconium dioxide and ferric hydroxide or any additional oxyanion absorbing materials. In various embodiments, the first and third embodiments of the method described above are modified such that both nano-enabled activated carbon particles including titanium dioxide and/or zirconium dioxide and nano-enabled activated carbon particles including ferric hydroxide are combined together to form the mass. In various embodiments, ferric hydroxide and titanium dioxide and/or zirconium dioxide may be caused to precipitate within the pores of a single mass of activated carbon particles according to the above methods in sequence (for example, first titanium dioxide and/or zirconium dioxide is caused to precipitate from solution in the pores and then ferric hydroxide is caused to precipitate from solution in the pores).

For purposes of this disclosure, the four embodiments of the method of preparing a nano-enabled activated carbon block disclosed above may be referred to as an "in situ" method of preparing nano-enabled activated carbon blocks.

A method referred to as "ex situ" may be used to prepare activated carbon blocks doped with titanium dioxide particles, zirconium dioxide particles, or ferric hydroxide particles. The ex situ method differs from the above embodiments of the in situ method in that there is no precipitation step; rather, activated carbon particles are combined directly with the metal hydr(oxide) nanoparticles (e.g. titanium dioxide particles and/or ferric hydroxide particles and/or zirconium dioxide particles) to prepare a mass and this mass is then used in accordance with the method described above to prepare activated carbon blocks doped with metal oxide nanoparticles (e.g. titanium dioxide particles, zirconium dioxide particles, or ferric hydroxide particles).

In various embodiments, the in situ and ex situ methods may be used in combination to prepare a nano-enabled activated carbon block.

In further embodiments, it is contemplated that other metals may be used in place of and/or in addition to titanium and/or zirconium and/or iron. Thus, in such embodiments, reference herein to the "titanium compound" (or the like) and/or the "zirconium compound" (or the like) and/or the "iron compound" (or the like) can be replaced with a "metal(lic) precursor," such as a "metal precursor" or a "metallic precursor." With such a precursor, the metal can be as described below. Further, in such embodiments, reference to the "titanium dioxide" (or the like) and/or the "zirconium dioxide" (or the like) and/or the "iron oxide" (or the like) can be replaced with a "metal (hydr)oxide," such as "metal oxide" or "metal hydroxide."

In various embodiments, $TiO_2$ and/or $ZrO_2$ is replaced with a different metal oxide where the metal oxide comprises a first metal and $Fe(OH)_3$ is replaced with a different metal hydroxide where the different metal hydroxide comprises a second metal. The first metal and/or the second metal may be selected from the group consisting of the transition metals of Groups 3-12 of the Periodic Table, aluminum, gallium, indium, thallium, tin, lead, bismuth, beryllium, the actinides, and mixtures thereof, optionally titanium, iron, zirconium, hafnium, thorium, and mixtures thereof. In certain embodiments, the metal (or metallic) precursor is selected from the group of titanium oxysulfate, zirconium oxysulfate, and ferric chloride.

In various embodiments, the thermally hydrolysable titanium compound and/or zirconium compound is replaced with a thermally hydrolysable metal compound comprising the first metal and the anhydrous $FeCl_3$ is replaced with a metal compound comprising the second metal where the second metal may undergo pH mediated precipitation from a solution comprising the metal compound. The thermally hydrolysable metal compound may undergo thermally assisted hydrolysis to yield the metal oxide comprising the first metal. pH mediated precipitation from a solution comprising the metal compound yields the metal hydroxide comprising the second metal.

The following examples, illustrating the compositions and methods of this disclosure, are intended to illustrate and not to limit the disclosure.

EXAMPLES

Preparing Carbon Blocks

Two nano-enabled activated carbon blocks were prepared according to the in situ method of the disclosure. One nano-enabled activated carbon block included 8 wt. % titanium dioxide nanoparticles based upon a mass of the nano-enabled activated carbon block and one nano-enabled activated carbon block included 26 wt. % ferric hydroxide nanoparticles based upon a mass of the nano-enabled activated carbon block. One activated carbon block doped with 5 wt. % titanium dioxide particles based upon a mass of the activated carbon block was prepared according to the ex situ method of the disclosure using commercially available P25 titanium dioxide nanoparticle powder.

Miniature carbon blocks (as opposed to full-sized blocks) were used in the examples; therefore, volumetric measurements have been multiplied by a constant so as to facilitate comparison to full scale blocks. Thus, full scale equivalent (eq.) treated liters (L) are provided in the figures.

Tap Water Used

Ada, MI tap water was routinely used in experiments. The Ada, MI tap water had a pH of 7.0-7.5, a hardness of 140-150 ppm, a total organic carbon of 2-4 ppm, a sodium ion concentration of 1-10 ppm, a total dissolved solids of 180-200 ppm, and a turbidity of less than <1 NTU.

Tempe, Ariz. tap water was used in experiments to evaluate the impact of tap water characteristics on arsenic absorbance. The Tempe, Ariz. tap water had a pH of 7.5-8, a hardness of 200-450 ppm, a total organic carbon of 3-5 ppm, a sodium ion concentration of 150-350 ppm, a total dissolved solids of 700 ppm, and a turbidity of <0.1 NTU.

Quantification of Metal Concentrations

The Ti or Fe content of the nano-enabled activated carbon blocks or the activated carbon block doped with titanium dioxide particles were determined by gravimetry or by X-ray fluorescence.

Arsenic concentrations in effluent streams were determined using ICP-MS. Two standard methods refer to: 1) US EPA Method 200.8 DETERMINATION OF TRACE ELEMENTS IN WATERS AND WASTES OFFICE OF RESEARCH AND DEVELOPMENT; and 2) 3125 METALS BY INDUCTIVELY COUPLED PLASMA—MASS SPECTROMETRY (2017)", Standard Methods For the Examination of Water and Wastewater. DOI: 10.2105/SMWW.2882.048. The disclosures of these two test methods are incorporated herein by reference. Arsenic absorbed by a nano-enabled activated carbon block or the activated carbon block doped with titanium dioxide particles was measured by X-ray fluorescence.

Activated Carbon Block Effluent Evaluations

Tempe, Ariz. tap water was caused to pass through the nano-enabled activated carbon blocks and the activated carbon block doped with titanium dioxide particles. Effluent passing out of each block was evaluated.

FIG. 1 shows that there is little to no Ti leaching from the nano-enabled activated carbon blocks including titanium dioxide nanoparticles over background Ti concentrations in the Tempe, Ariz. tap water.

Figure 2:
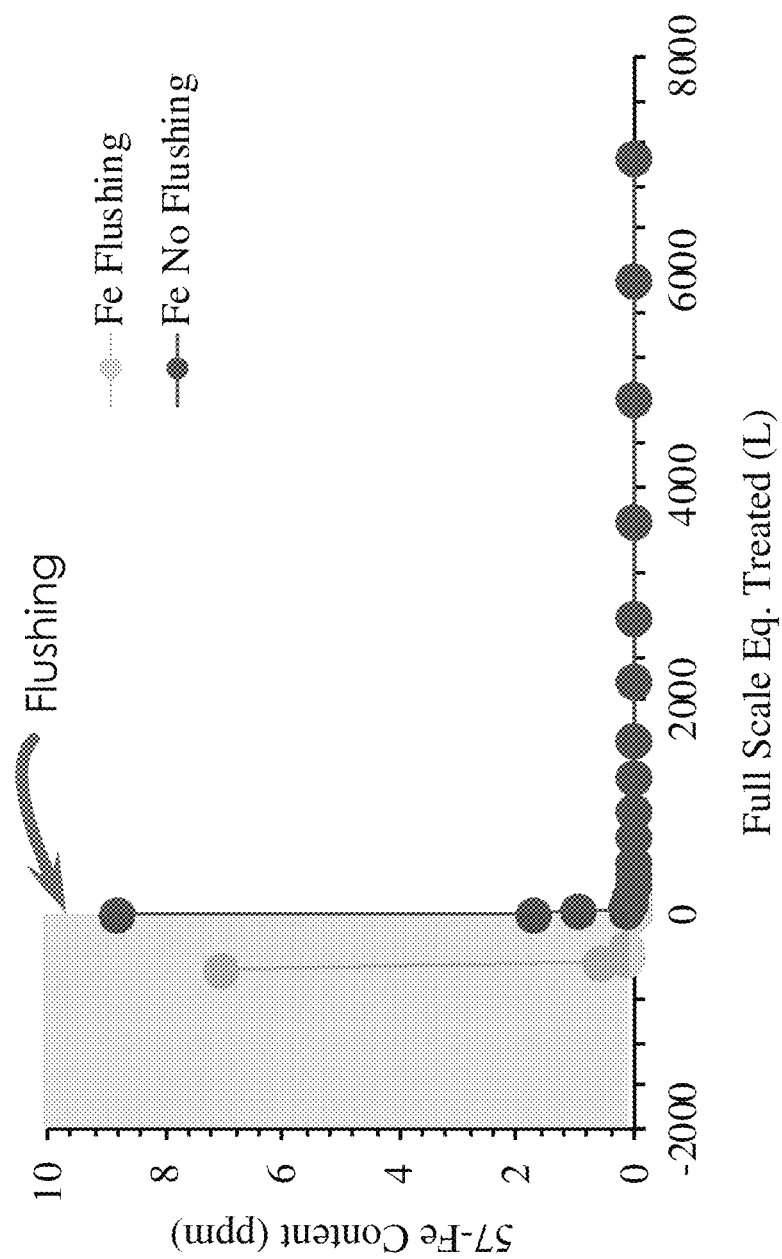
FIG. 2 is a scatter plot showing that Fe does not leach from a nano-enabled activated carbon block including $FeOH_3$ nanoparticles following flushing of the nano-enabled activated carbon block.

FIG. 2 shows that the nano-enabled activated carbon blocks including ferric hydroxide initially leach Fe; however, the leaching ceases after an initial flushing period. Therefore, if the blocks are flushed prior to use, they leach negligible or no Fe into the effluent.

Figure 3:
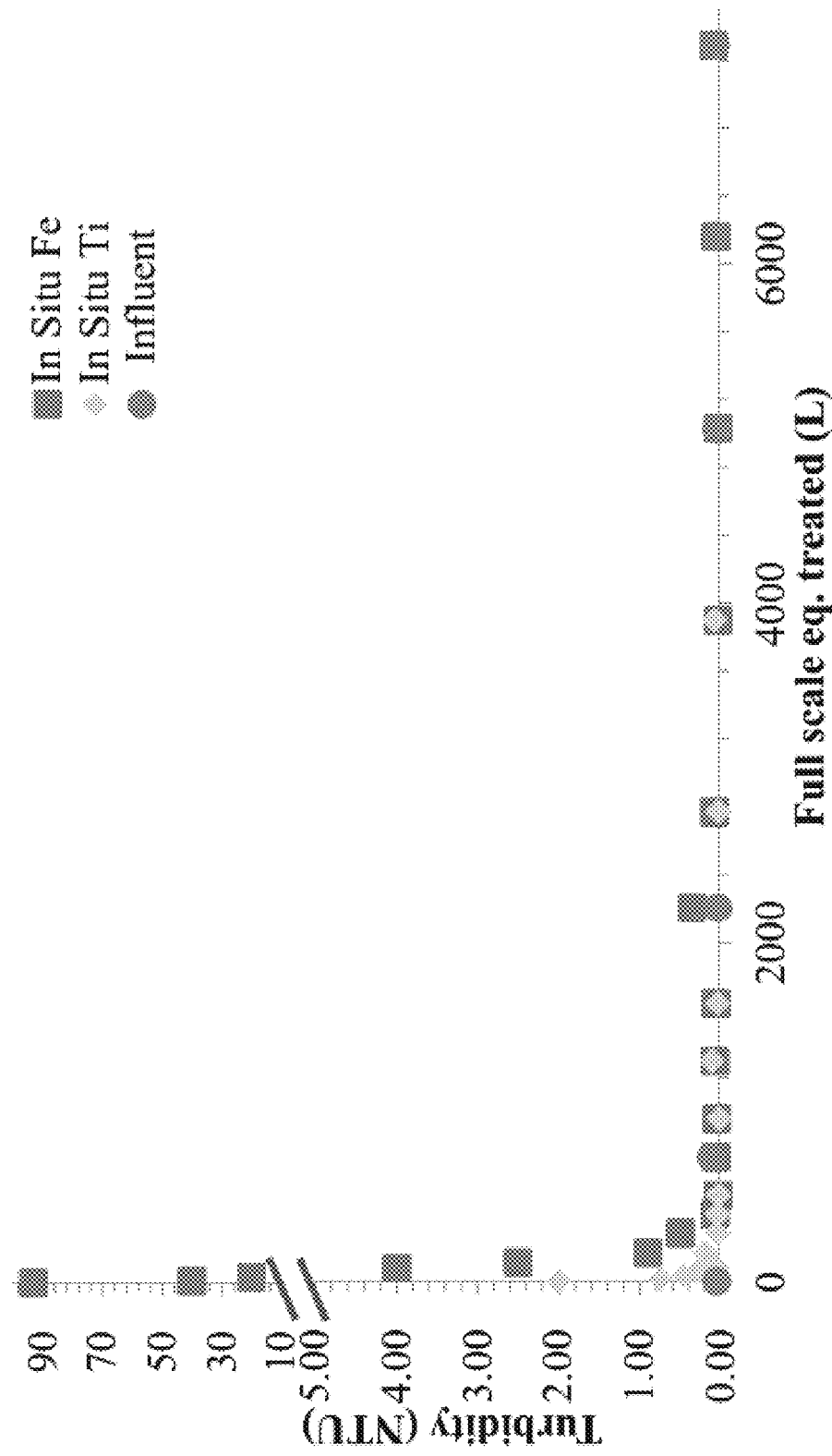
FIG. 3 is a scatter plot showing turbidity measurements of effluent water exiting from nano-enabled activated carbon blocks.

FIG. 3 shows that there is an initial increase in the turbidity of effluent exiting the nano-enabled activated carbon blocks with a larger increase occurring in the case of the nano-enabled activated carbon block including ferric hydroxide nanoparticles; however, any increase in turbidity can be eliminated by flushing with the tap water, as shown in FIG. 3.

Figure 4:
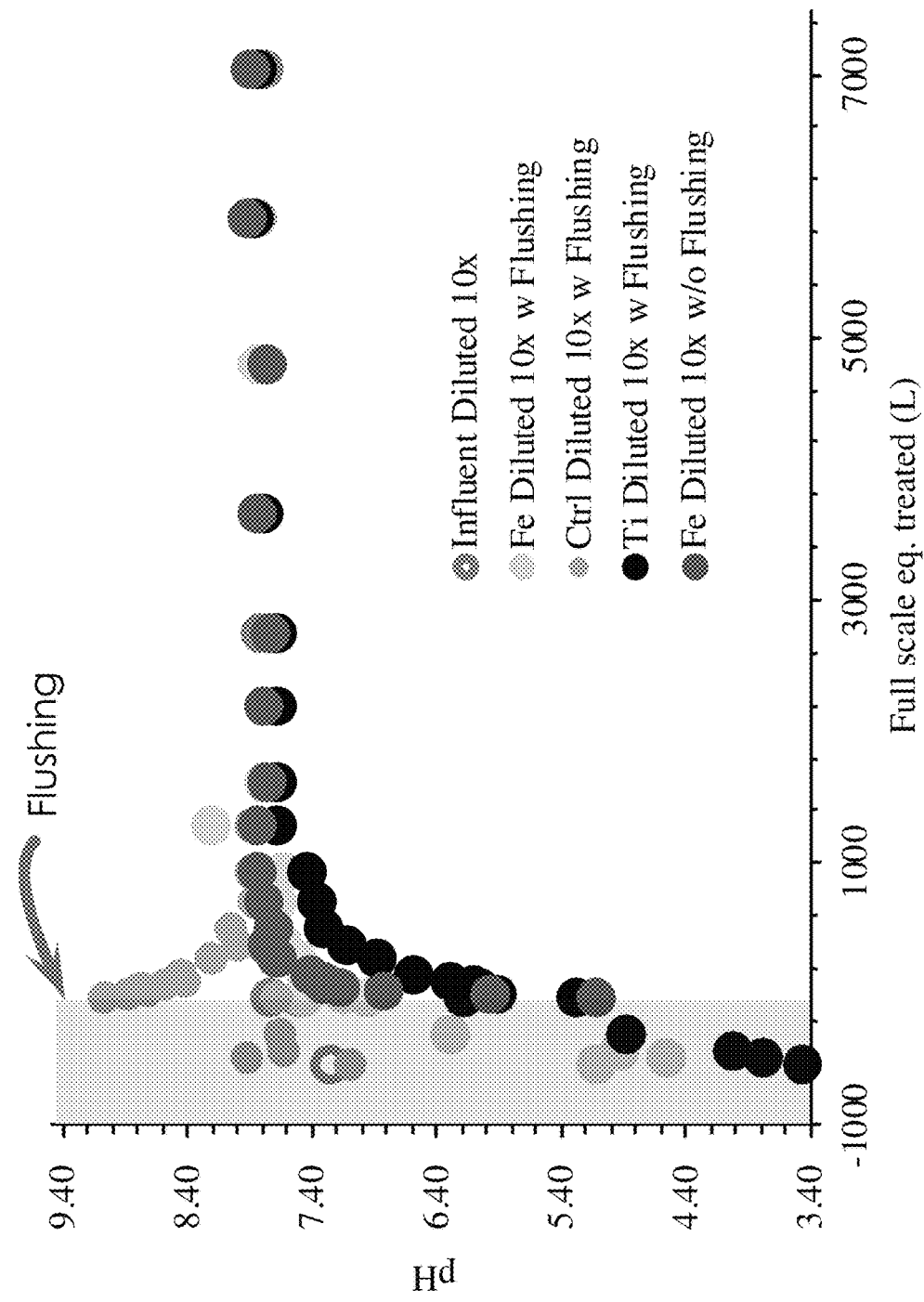
FIG. 4 is a scatter plot showing an initial reduction in pH of effluent passing out of nano-enabled activated carbon blocks prior to flushing.

FIG. 4 shows that there is an initial decrease in pH of effluent exiting from the nano-enabled activated carbon blocks. The decrease in pH was no longer observed after an initial flushing period. The influent tap water used in the experiments corresponding to the data displayed in FIG. 4 was diluted 10× with deionized water. FIG. 4 also shows pH of effluent exiting from a control (ctrl) activated carbon block including no metal oxide and prepared according to the method provided above for preparing an activated carbon block from a binder and activated carbon particles. pH of the tap water (influent) is also plotted in FIG. 4. Activated carbon block arsenic absorbance evaluations Tempe, Ariz. tap water supplemented with 100 ppb arsenic was caused to pass through the nano-enabled activated carbon blocks and the activated carbon block doped with titanium dioxide particles. Arsenic concentrations in effluent passing out of the blocks was evaluated as well as arsenic absorbed by, and thereby retained by, the blocks. The goal or target arsenic concentration in the effluent is any concentration less than 10 ppb.

Figure 5:
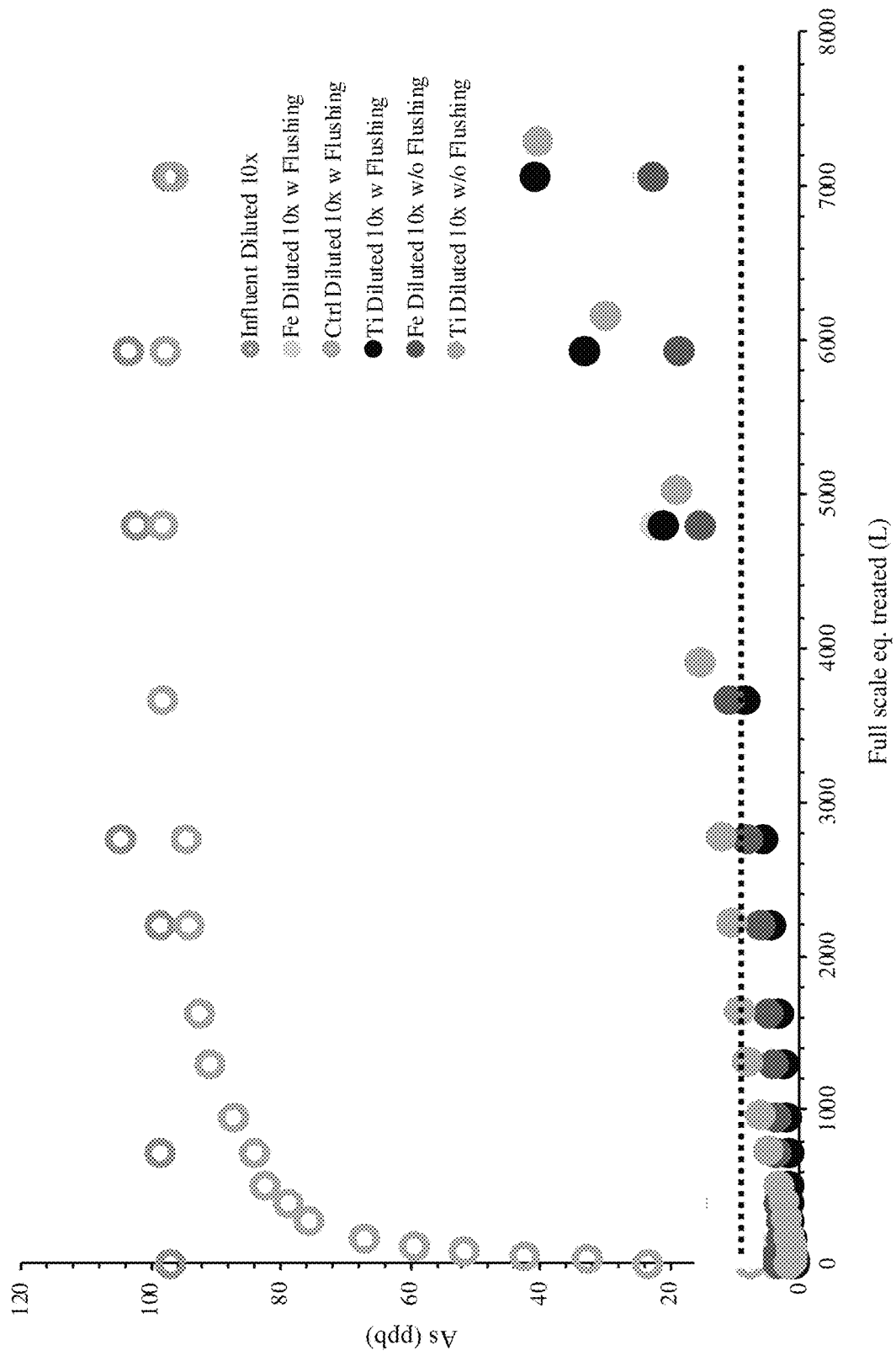
FIG. 5 is a scatter plot showing arsenic absorption by nano-enabled activated carbon blocks subsequent to flushing.

FIG. 5 shows the concentration of arsenic in effluent passing out of the nano-enabled activated carbon blocks and the control. The influent tap water used in the experiments corresponding to the data displayed in FIG. 5 was diluted 10× with deionized water prior to the addition of arsenic thereto. Absorbance of arsenic by the nano-enabled activated carbon blocks was evaluated with (w) or without (w/o) prior flushing of the blocks with 200-500 block volumes (BV) of arsenic-free tap water. Table 1 lists the quantity of arsenic absorbed by the blocks (q=μg As/g carbon block) as well as the volume, provided as BVs, of 100 ppb arsenic tap water filtered prior to effluent exceeding a 10 ppb arsenic concentration. In a similar experiment for which the data is not plotted in FIG. 5, the nano-enabled activated carbon block including ferric hydroxide nanoparticles absorbed over 639 μg As/g.

Figure 6:
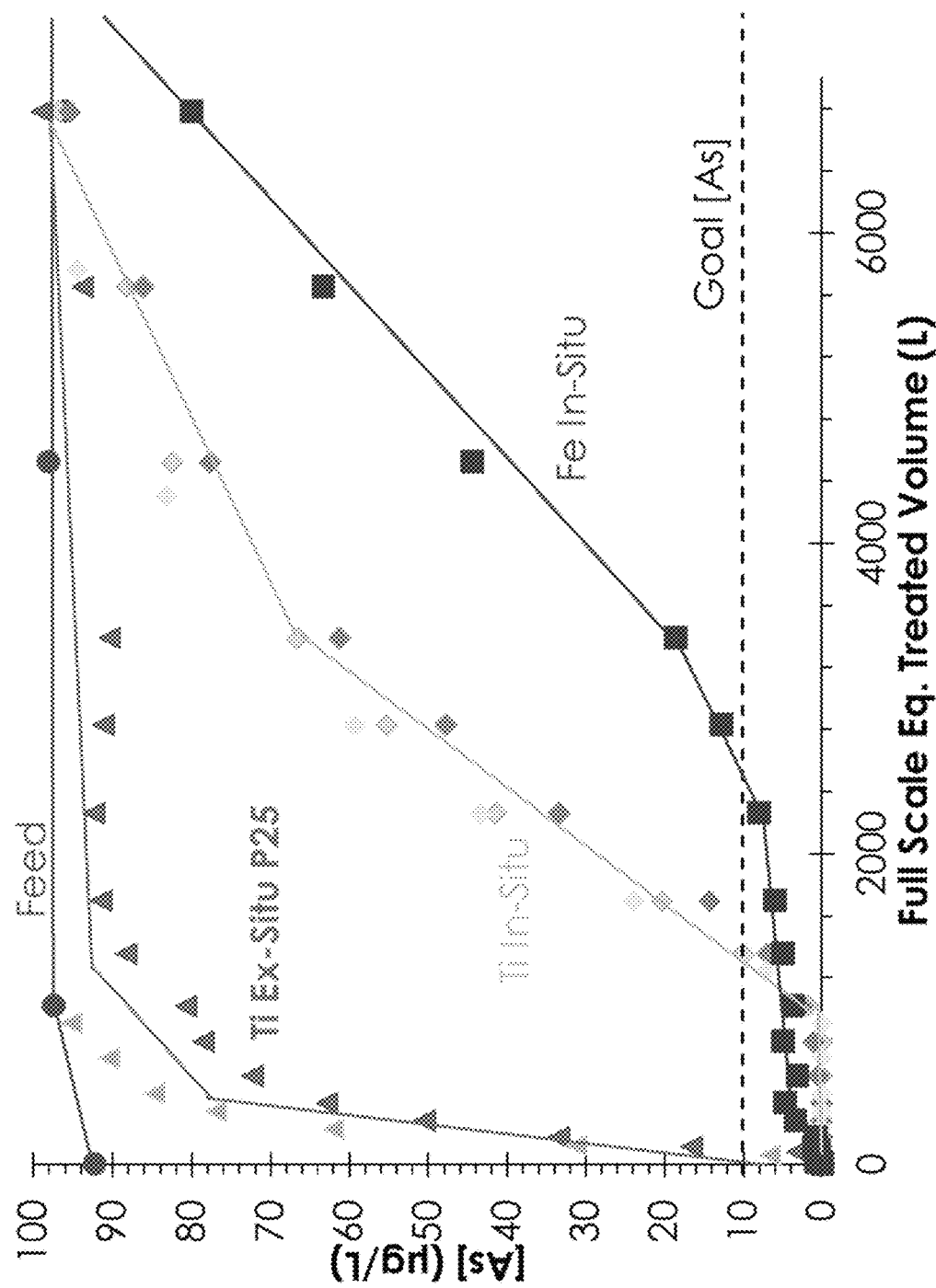
FIG. 6 is a scatter plot comparing arsenic absorption by nano-enabled activated carbon blocks prepared according to the methods of the disclosure (In-Situ) and a nano-enabled activated carbon block prepared according to an alternative method (Ex-Situ P25)

FIG. 6 shows that the nano-enabled activated carbon blocks prepared according to the in situ method absorb arsenic more effectively than the activated carbon block doped with titanium dioxide particles prepared by the ex situ method (absorbing only about 80 μg As/g) as well as the control (shown in FIG. 6 as light triangles). In FIG. 6 the concentration of arsenic in the feed Tempe, Ariz. tap water (influent tap water) is also shown. FIG. 6 also shows that the nano-enabled activated carbon blocks including ferric hydroxide absorb more arsenic than the nano-enabled activated carbon blocks including titanium dioxide. In a similar experiment where the tap water was diluted 10× with deionized water prior to being supplemented with arsenic, the activated carbon block doped with titanium dioxide particles (i.e., prepared by the ex-situ method) absorbed only 126 μg As/g.

Figure 7:
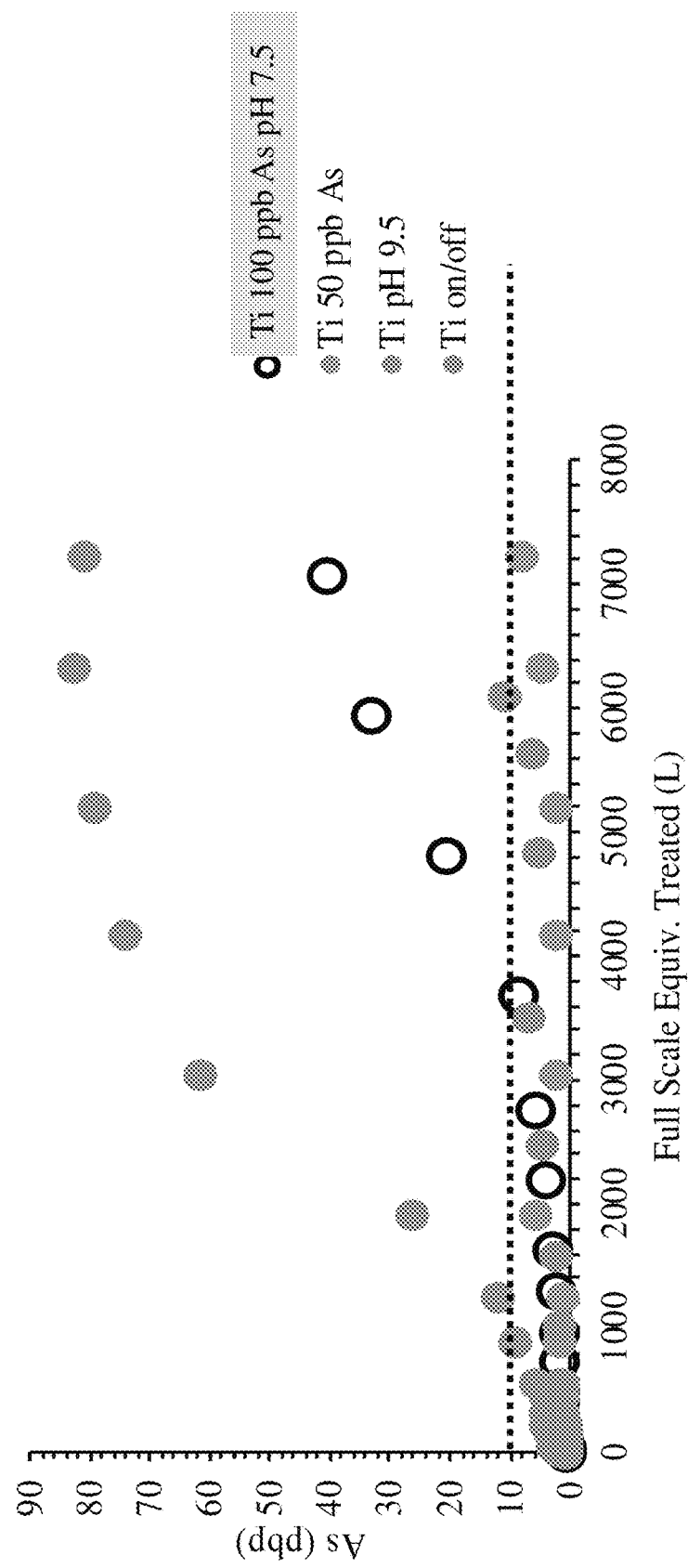
FIG. 7 is a scatter plot showing arsenic absorption by nano-enabled activated carbon blocks including $TiO_2$ nanoparticles under different influent conditions.

FIG. 7 shows the effect of different influent water conditions on the absorbance of arsenic therefrom by the nano-enabled activated carbon block including titanium dioxide nanoparticles. The term "on/off" in FIG. 7 refers to a condition where an influent application was periodically stopped for a period of time and then resumed throughout an experiment. pH 9.5 in FIG. 7 refers to the pH of an influent. One of the experiments conducted in the preparation of FIG. 7 included an influent having an arsenic concentration of only 50 ppb, as indicated, and not 100 ppb. From FIG. 7 it is apparent that influent conditions have an important and measurable influence on the absorbance of arsenic by the nano-enabled activated carbon blocks. Table 2 lists the quantity of arsenic absorbed by the blocks (q=μg As/g carbon block) as well as the volume, provided as BVs, of arsenic tap water filtered prior to effluent exceeding a 10 ppb arsenic concentration. In a similar experiment for which the data is not plotted in FIG. 5, the nano-enabled activated carbon block including ferric hydroxide nanoparticles absorbed over 639 μg As/g. Also provided in Table 2 are quantities corresponding to a block wherein the influent included Tempe, Ariz. tap water having 100 ppb arsenic or Tempe, Ariz. tap water supplemented with 100 ppb arsenic after being diluted 10× with deionized water. In similar experiments where influent included Tempe, Ariz. tap water having 100 ppb arsenic, the nano-enabled activated carbon block including ferric hydroxide nanoparticles demonstrated an arsenic absorbance capacity of 352 μg As/g and the activated carbon block doped with titanium dioxide particles absorbed only 61 μg As/g.

TABLE 1

|  | Ctrl w/ Flushing | Ti w/o Flushing | Ti w/ Flushing | Fe Diluted w/o Flushing | Fe w/ Flushing |
|---|---|---|---|---|---|
| q (μg As/g) | 92 | 597 | 832 | 800 | 832 |
| ≥10 ppb in effluent | ~5 BVs | ~2000 BVs | ~3500 BVs | ~3200 BVs | ~4000 BVs |

TABLE 2

|  | Ti Tempe Tap w/o flushing | Ti 10x Diluted w/o flushing | Ti 10X diluted w/ flushing | Ti pH 9.5 | Ti on/off | Ti 50 ppb As |
|---|---|---|---|---|---|---|
| q (μg As/g) | 341 | 597 | >832 | 406 | >727 | >494 |
| ≥10 ppb in effluent | ~1000 BVs | ~2000 BVs | ~4000 BVs | ~1000 BVs | ~6000 BVs | >7000 BVs |

Figure 8:
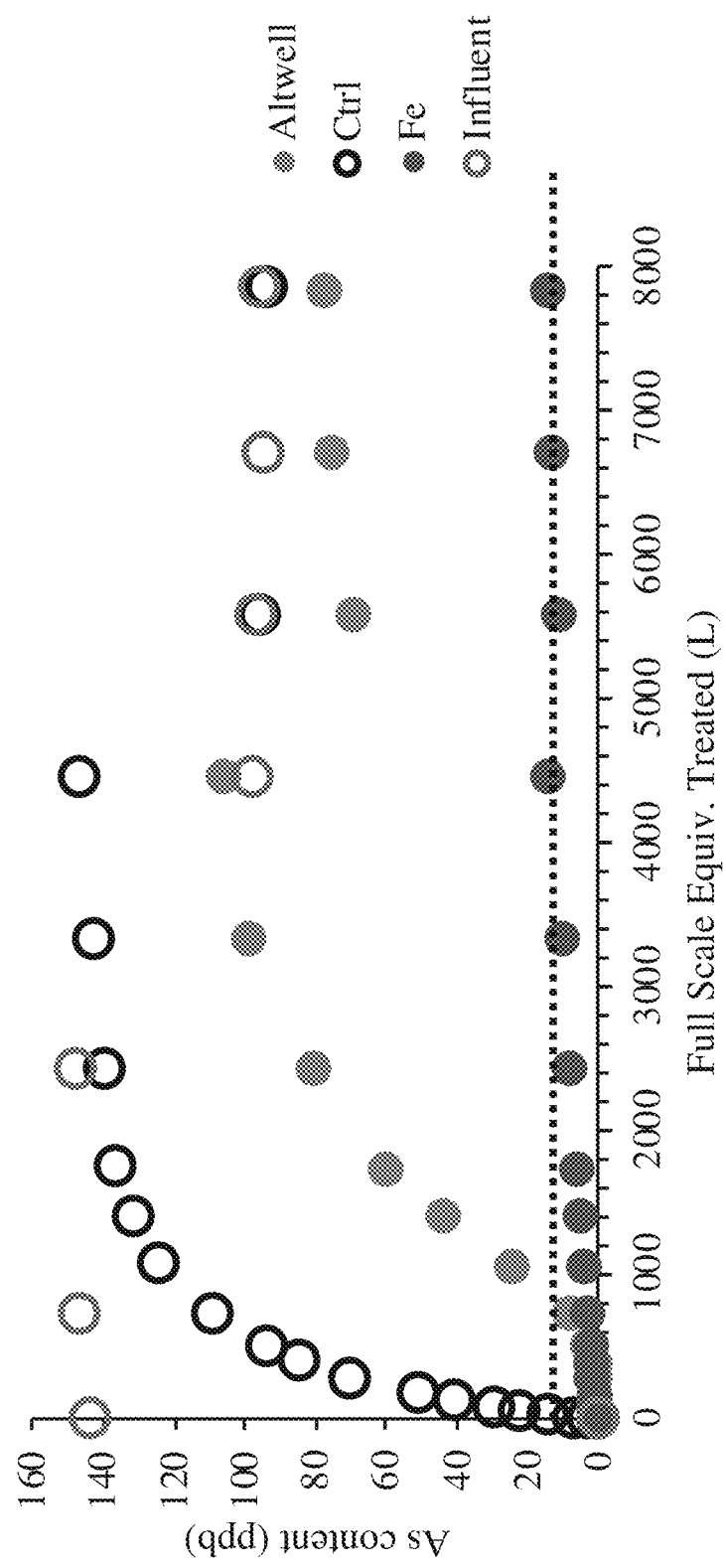
FIG. 8 is a scatter plot showing arsenic absorption by a nano-enabled activated carbon block including $Fe(OH)_3$ nanoparticles in comparison to a control and a commercially available product (ALTWELL).

FIG. 8 shows that the nano-enabled activated carbon block including ferric hydroxide nanoparticles has superior arsenic absorbance capacity over the control or a commercially available ALTWELL activated carbon block. Table 3 below lists the quantity of arsenic absorbed by the blocks (q=µg As/g carbon block) as well as the volume, provided as BVs, of arsenic tap water filtered prior to effluent exceeding a 10 ppb arsenic concentration.

TABLE 3

|  | Ctrl 10X diluted w/ flushing | Altwell 10X diluted w/ flushing | Fe 10X diluted w/ flushing |
|---|---|---|---|
| q (µg As/g) | 82 | 676 | >843 |
| ≥10 ppb in effluent | ~30 BVs | ~1000 BVs | ~4000 BVs |

Additional Embodiments

The following additional embodiments are provided, the numbering of which is not to be construed as designating levels of importance.

Embodiment 1 relates to a method of preparing a nano-enabled activated carbon block, the nano-enabled activated carbon block comprising activated carbon defining pores and titanium dioxide ($TiO_2$) particles disposed in the pores, the method comprising: providing an aqueous solution comprising a hydrolyzable titanium compound; providing activated carbon particles; combining the aqueous solution and the activated carbon particles to form a slurry; heating the slurry to a temperature of from about 80° C. to about 95° C. such that the hydrolyzable titanium compound hydrolyzes within the pores of the activated carbon particles to become deposited within the pores of the activated carbon particles as nanoparticles thereby producing precursor nano-enabled activated carbon particles; optionally, wherein following heating of the slurry, the $TiO_2$ substantially conforms to an amorphous or non-anatase crystalline structure; rinsing the precursor nano-enabled activated carbon particles with water to remove byproducts and/or impurities therefrom; rinsing the precursor nano-enabled activated carbon particles with a neutralizing agent to neutralize the precursor nano-enabled activated carbon particles; and drying the precursor nano-enabled activated carbon particles.

Embodiment 2 relates to Embodiment 1, further comprising: combining the precursor nano-enabled activated carbon particles with a binder to form a mass; compressing the mass at a pressure of from about 30 psi to about 120 psi; heating the mass under pressure to a temperature of from about 175° C. to about 205° C. thereby producing nano-enabled activated carbon particles secured within a binder matrix to thereby produce the nano-enabled activated carbon block; and cooling the nano-enabled activated carbon block; optionally, wherein following heating of the mass, the $TiO_2$ substantially conforms to an anatase crystalline structure.

Embodiment 3 relates to a method of preparing a nano-enabled activated carbon block, the nano-enabled activated carbon block comprising activated carbon defining pores and titanium dioxide ($TiO_2$) particles disposed in the pores, the method comprising: providing an activated carbon block formed from activated carbon particles and a binder; providing an aqueous solution comprising a hydrolyzable titanium compound; contacting the activated carbon block and the aqueous solution to fill the pores with the aqueous solution; heating the aqueous solution to a temperature of from about 80° C. to about 95° C. such that the hydrolyzable titanium compound hydrolyzes within the pores of the activated carbon particles to become deposited within the pores of the activated carbon particles as nanoparticles thereby forming a nano-enabled activated carbon block intermediate; optionally, wherein following heating of the aqueous solution, the $TiO_2$ substantially conforms to an amorphous or non-anatase crystalline structure; rinsing the nano-enabled activated carbon block intermediate with water to remove byproducts and/or impurities therefrom; rinsing the nano-enabled activated carbon block intermediate with a neutralizing agent to neutralize the nano-enabled activated carbon block intermediate; heating the nano-enabled activated carbon block intermediate to a temperature of from about 175° C. to about 205° C. thereby producing the nano-enabled activated carbon block; optionally, wherein following heating of the nano-enabled activated carbon block intermediate, the $TiO_2$ substantially conforms to an anatase crystalline structure.

Embodiment 4 relates to Embodiment 2 or 3, wherein the nano-enabled activated carbon block comprises from about 5 wt. % to about 15 wt. % titanium.

Embodiment 5 relates to any one of Embodiments 1-4, wherein the hydrolyzable titanium compound comprises titanium oxysulfate ($TiOSO_4$).

Embodiment 6 relates to a method of preparing a nano-enabled activated carbon block, the nano-enabled activated carbon block comprising activated carbon defining pores and iron hydroxide ($Fe(OH)_3$) particles disposed in the pores, the method comprising: providing a solution comprising anhydrous iron trichloride ($FeCl_3$) and an alcohol; providing activated carbon particles; combining the solution and the activated carbon particles to form a slurry; raising pH of the slurry, optionally to about 12, such that $Fe(OH)_3$ precipitates out of the solution producing nano-enabled activated carbon particles comprising the activated carbon particles with $Fe(OH)_3$ nanoparticles deposited within the pores thereof; rinsing the nano-enabled activated carbon particles with water to remove byproducts and/or impurities therefrom; rinsing the nano-enabled activated carbon particles with a neutralizing agent to neutralize the nano-enabled activated carbon particles; and drying the nano-enabled activated carbon particles.

Embodiment 7 relates to Embodiment 6, further comprising: combining the nano-enabled activated carbon particles with a binder to form a mass; compressing the mass at a pressure of from about 30 psi to about 120 psi; heating the mass under pressure to a temperature of from about 175° C. to about 205° C. thereby producing the nano-enabled activated carbon block; and cooling the nano-enabled activated carbon block.

Embodiment 8 relates to a method of preparing a nano-enabled activated carbon block, the nano-enabled activated carbon block comprising activated carbon defining pores and iron hydroxide ($Fe(OH)_3$) particles disposed in the pores, the method comprising: providing an activated carbon block formed from activated carbon particles and a binder; providing a solution comprising anhydrous iron trichloride ($FeCl_3$) and an alcohol; contacting the activated carbon block and the solution to fill the pores with the solution; raising pH of the solution, optionally to about 12, such that $Fe(OH)_3$ precipitates out to form a nano-enabled activated carbon block comprising the activated carbon with $Fe(OH)_3$ nanoparticles deposited within pores thereof; rinsing the nano-enabled activated carbon block with water to remove byproducts and/or impurities therefrom; rinsing the nano-enabled activated carbon block with a neutralizing agent to neutralize the nano-enabled activated carbon block.

Embodiment 9 relates to Embodiment 7 or 8, wherein the nano-enabled activated carbon block comprises from about 20 wt. % to about 35 wt. % iron.

Embodiment 10 relates to any one of Embodiments 6-9, wherein the alcohol comprises methanol.

Embodiment 11 relates to any one of Embodiments 1-10, wherein the neutralizing agent comprises sodium bicarbonate ($NaHCO_3$).

Embodiment 12 relates to any one of Embodiments 2-5 or 7-11, wherein the binder comprises an ultra-high molecular weight binder, optionally the ultra-high molecular weight binder having a melt index of not more than 1 g/min as measured using ASTM D1238 at 190° C. and 15 kg load.

Embodiment 13 relates to any one of Embodiments 1-12, wherein the activated carbon particles include a mean particle diameter in the range of about 60 to about 80 μm and a particle size distribution having less than 10 wt. % particles larger than 140 mesh and less than 10 wt. % particles smaller than 500 mesh, wherein wt. % is measured with respect to a total mass of the activated carbon.

Embodiment 14 relates to Embodiments 2-5 or 7-13, further comprising flushing the nano-enabled activated carbon block with water.

Embodiment 15 relates to a nano-enabled activated carbon block prepared according to the method of any one of Embodiments 1-14.

Embodiment 16 relates to Embodiment 15, having a capacity to absorb at least 300 μg of a heavy metal per gram of the nano-enabled activated carbon block, wherein the heavy metal is absorbed from an aqueous solution having a pH of about 7.5 and the aqueous solution is placed in contact with the nano-enabled activated carbon block, and wherein the aqueous solution comprises approximately 100 ppb of the heavy metal prior to contacting the nano-enabled activated carbon block, wherein the heavy metal is in a form selected from the group consisting of arsenate, arsenite, arsenic, and mixtures thereof.

Embodiment 17 relates to a household water filtration system comprising the nano-enabled activated carbon block according to Embodiment 15 or 16.

Embodiment 18 relates to Embodiment 17, configured such that water passing through the filtration system has an average retention time of 5 seconds or less.

Embodiment 19 relates to Embodiment 17 or 18, in fluid communication with a faucet of a household sink.

Embodiment 20 relates to a method of filtering water, the method comprising: providing the household water filtration system of any one of Embodiments 17-19; and flowing tap water through the filtration system; wherein a concentration of a metal oxyanion in water exiting the filtration system is equal to or lower than that in tap water entering the filtration system.

For purposes of this disclosure, the term "particles" is a genus understood to be inclusive of the sub-genus "nanoparticles."

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A method of preparing an activated carbon block, the activated carbon block comprising activated carbon defining pores and iron hydroxide ($Fe(OH)_3$) particles disposed in the pores, said method comprising:
    providing a solution comprising anhydrous iron trichloride ($FeCl_3$) and an alcohol;
    providing activated carbon particles;
    combining the solution and the activated carbon particles to form a slurry;
    raising pH of the slurry such that $Fe(OH)_3$ precipitates out of the solution producing activated carbon particles comprising the activated carbon particles with $Fe(OH)_3$ nanoparticles deposited within the pores thereof;
    rinsing the activated carbon particles with water to remove byproducts and/or impurities therefrom;
    rinsing the activated carbon particles with a neutralizing agent to neutralize the activated carbon particles;
    drying the activated carbon particles; and
    forming the activated carbon block with the activated carbon particles.

2. The method of claim 1, wherein the step of forming the activated carbon block with the activated carbon particles comprises:
    combining the activated carbon particles with a binder to form a mass;
    compressing the mass at a pressure of from about 30 psi to about 120 psi; and
    heating the mass under pressure to a temperature of from about 175° C. to about 205° C. thereby producing the activated carbon block; and
further comprising:
    cooling the activated carbon block;
    optionally, flushing the activated carbon block with water;
    optionally, wherein the activated carbon particles include a mean particle diameter in the range of about 60 to about 80 µm and a particle size distribution having less than 10 wt. % particles larger than 140 mesh and less than 10 wt. % particles smaller than 500 mesh, wherein wt. % is measured with respect to a total mass of the activated carbon;
    optionally, wherein the binder comprises an ultra-high molecular weight binder, optionally the ultra-high molecular weight binder having a melt index of not more than 1 g/min as measured using ASTM D1238 at 190° C. and 15 kg load.

3. The method of claim 1, wherein:
    i) the activated carbon block comprises from about 20 wt. % to about 35 wt. % iron;
    ii) optionally, the alcohol comprises methanol.

4. The method of claim 3, wherein ii) the alcohol comprises methanol.

5. The method of claim 1, wherein:
    the activated carbon particles include a mean particle diameter in the range of about 60 to about 80 µm and a particle size distribution having less than 10 wt. % particles larger than 140 mesh and less than 10 wt. % particles smaller than 500 mesh, wherein wt. % is measured with respect to a total mass of the activated carbon; and
    the binder comprises an ultra-high molecular weight binder, optionally the ultra-high molecular weight binder having a melt index of not more than 1 g/min as measured using ASTM D1238 at 190° C. and 15 kg load.

6. The method of claim 1, wherein pH of the slurry is raised to about 12 in the step of raising pH of the slurry.

7. A method of preparing an activated carbon block, the activated carbon block comprising activated carbon defining pores and iron hydroxide ($Fe(OH)_3$) particles disposed in the pores, said method comprising:
    providing an activated carbon block formed from activated carbon particles and a binder;
    providing a solution comprising anhydrous iron trichloride ($FeCl_3$) and an alcohol;
    contacting the activated carbon block and the solution to fill the pores with the solution;
    raising pH of the solution such that $Fe(OH)_3$ precipitates out to form an activated carbon block comprising the activated carbon with $Fe(OH)_3$ nanoparticles deposited within pores thereof;
    rinsing the activated carbon block with water to remove byproducts and/or impurities therefrom;
    rinsing the activated carbon block with a neutralizing agent to neutralize the activated carbon block;
    optionally, flushing the activated carbon block with water;
    optionally, wherein the activated carbon particles include a mean particle diameter in the range of about 60 to about 80 µm and a particle size distribution having less than 10 wt. % particles larger than 140 mesh and less than 10 wt. % particles smaller than 500 mesh, wherein wt. % is measured with respect to a total mass of the activated carbon;
    optionally, wherein the binder comprises an ultra-high molecular weight binder, optionally the ultra-high molecular weight binder having a melt index of not more than 1 g/min as measured using ASTM D1238 at 190° C. and 15 kg load.

8. The method of claim 7, wherein:
    i) the activated carbon block comprises from about 20 wt. % to about 35 wt. % iron;
    ii) optionally, the alcohol comprises methanol.

9. The method of claim 8, wherein ii) the alcohol comprises methanol.

10. The method of claim 7, wherein:
    the activated carbon particles include a mean particle diameter in the range of about 60 to about 80 µm and a particle size distribution having less than 10 wt. % particles larger than 140 mesh and less than 10 wt. % particles smaller than 500 mesh, wherein wt. % is measured with respect to a total mass of the activated carbon; and
    the binder comprises an ultra-high molecular weight binder, optionally the ultra-high molecular weight binder having a melt index of not more than 1 g/min as measured using ASTM D1238 at 190° C. and 15 kg load.

11. The method of claim 7, wherein pH of the slurry is raised to about 12 in the step of raising pH of the slurry.

* * * * *